United States Patent [19]
Burnham

[11] Patent Number: 5,320,363
[45] Date of Patent: Jun. 14, 1994

[54] POST HOLE DIGGER

[76] Inventor: Francis L. Burnham, 1830 Five Chop Rd., Orangeburg, S.C. 29115

[21] Appl. No.: 83,641

[22] Filed: Jun. 25, 1983

Related U.S. Application Data

[63] Continuation-in-part of Ser. No. 55,183, Apr. 30, 1993, Pat. No. 5,273,331.

[51] Int. Cl.⁵ ................................................ A01B 1/18
[52] U.S. Cl. ...................................... 294/50.8; 294/57
[58] Field of Search ........................ 294/50.5–50.9, 294/53.5, 55, 57, 68.23, 115; 111/92, 101, 106

[56] References Cited

U.S. PATENT DOCUMENTS

| | | | |
|---|---|---|---|
| 902,070 | 10/1908 | Gooch | 294/50.8 X |
| 1,212,303 | 1/1971 | Witt | 294/50.8 X |
| 1,888,929 | 11/1932 | McDowell | 294/50.8 |
| 2,230,498 | 2/1941 | Loos et al. | 294/50.8 |
| 2,654,626 | 10/1953 | Rice | 294/50.8 |
| 2,703,251 | 3/1955 | Green | 294/50.8 |
| 2,987,836 | 6/1961 | Carlbom | 294/50.8 X |
| 4,694,760 | 9/1987 | Camp | 294/50.8 X |

FOREIGN PATENT DOCUMENTS

| | | | |
|---|---|---|---|
| 129603 | 4/1902 | Fed. Rep. of Germany | 294/50.8 |
| 739454 | 10/1955 | United Kingdom | 294/53.5 |

Primary Examiner—Johanny D. Cherry
Attorney, Agent, or Firm—Michael A. Mann

[57] ABSTRACT

A post hole digger having a bracket plate, a first shaft assembly and a second shaft assembly, each shaft assembly with a first end and a second end. The first ends of the shaft assemblies are connected to the bracket plate. A pair of handles are pivotally attached to the first ends, and a pair of digging blades are pivotally attached to the second ends of the shaft assemblies. As the handles are rotated with respect to one another, the first shaft assembly moves axially with respect to the second shaft assembly to open and close the digging blades. The shaft assemblies are held in spaced relation to one another during operation of the digger so that the hole has an approximately constant diameter. A detent mechanism is provided for indicating when the digging blades are oriented approximately parallel to one another for insertion into the ground. Extension rods increase the operating length of the shafts to allow digging deeper holes.

20 Claims, 5 Drawing Sheets

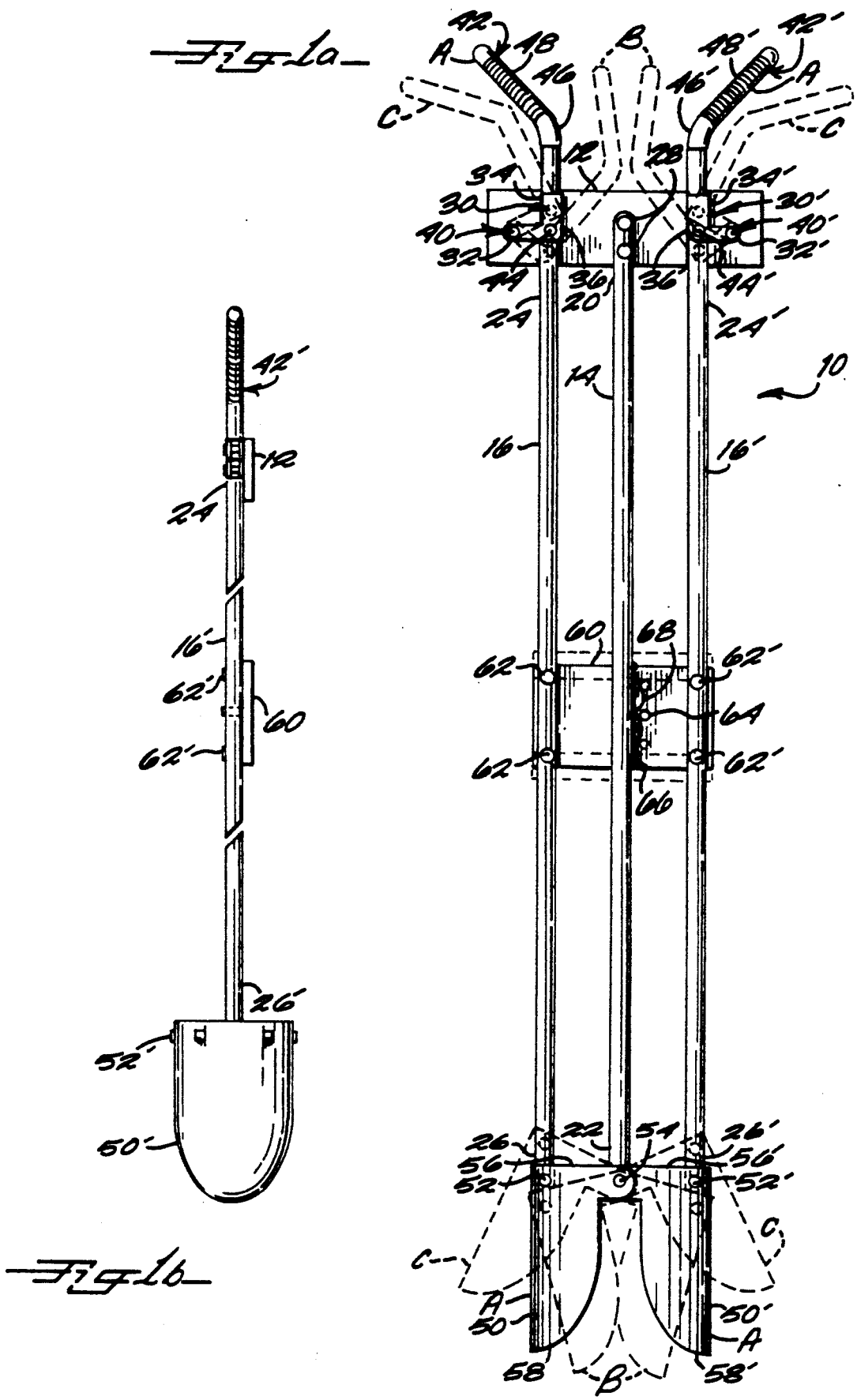

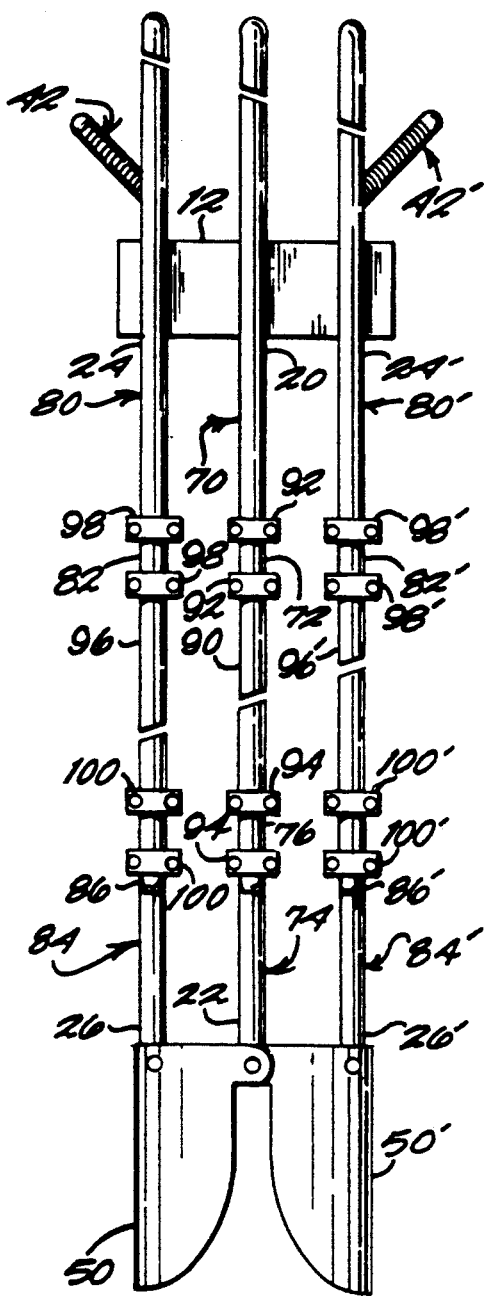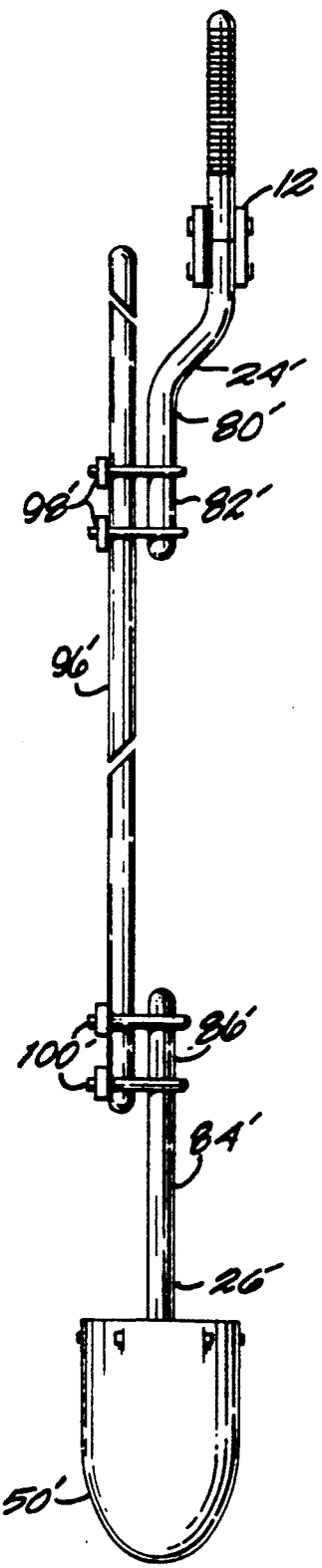

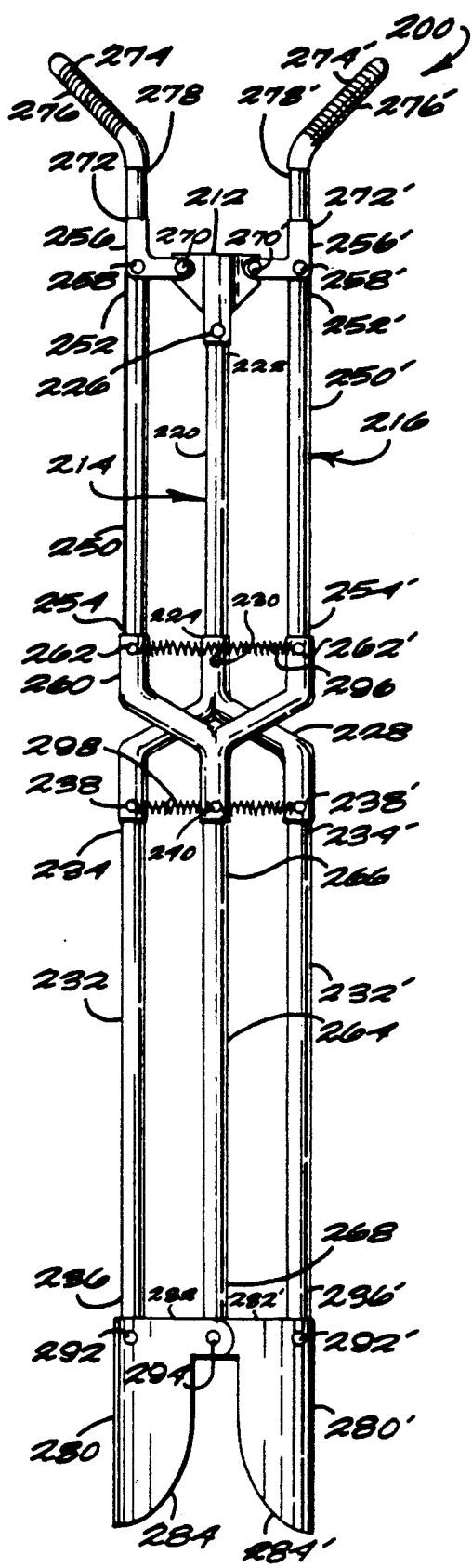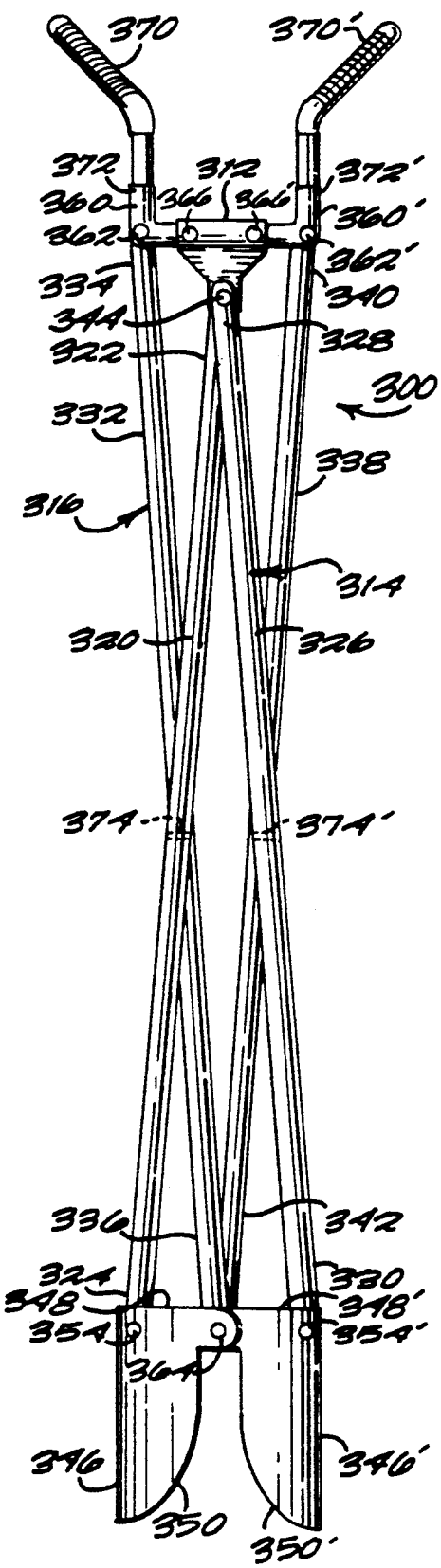

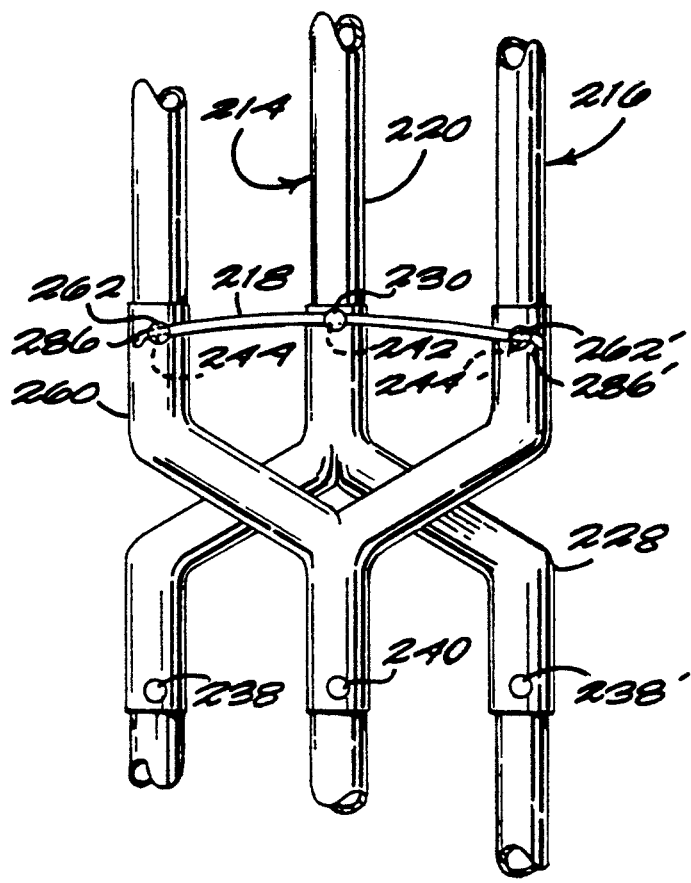
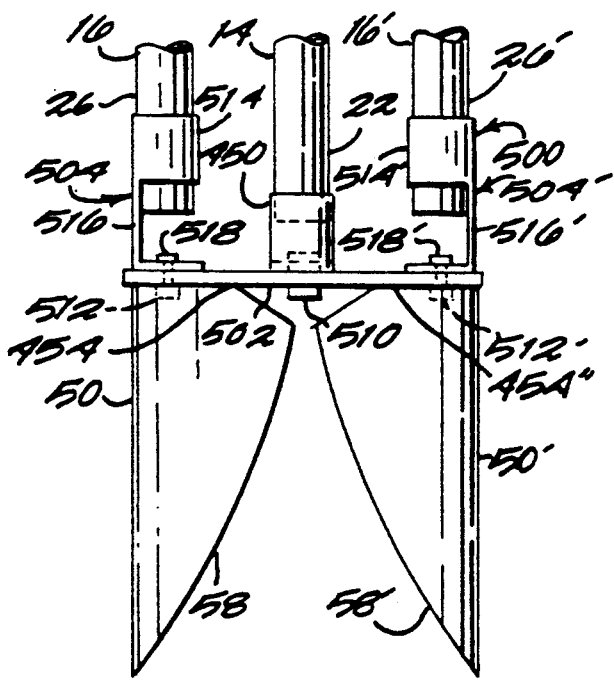
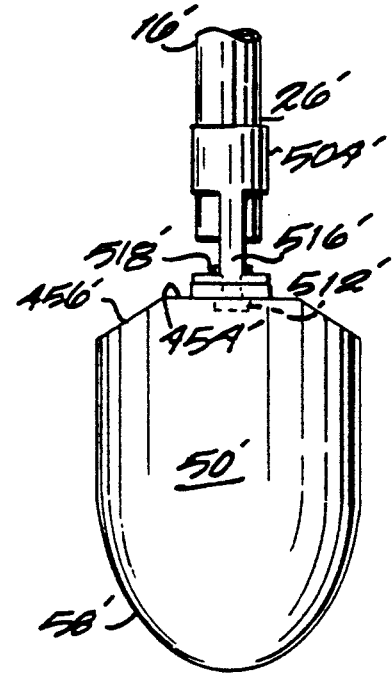

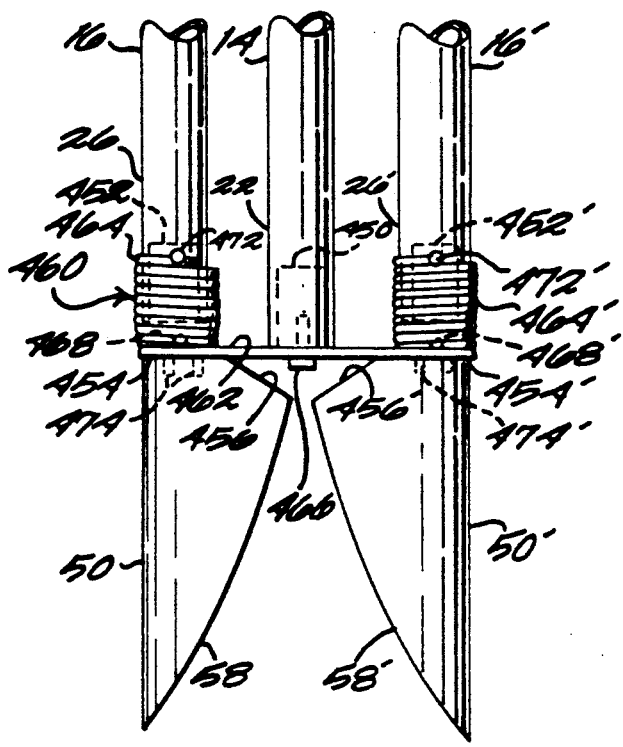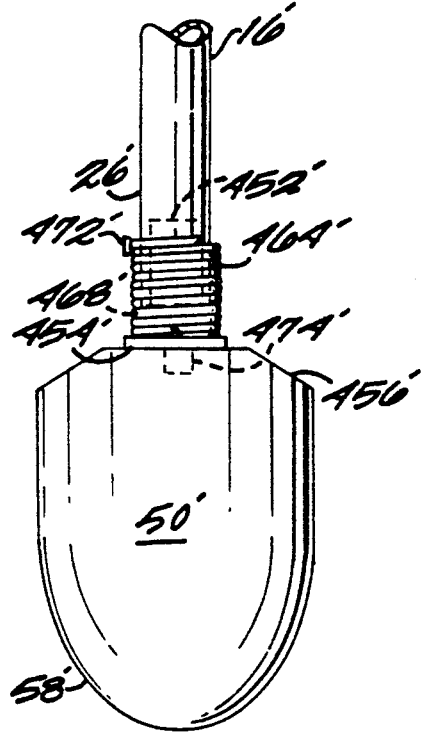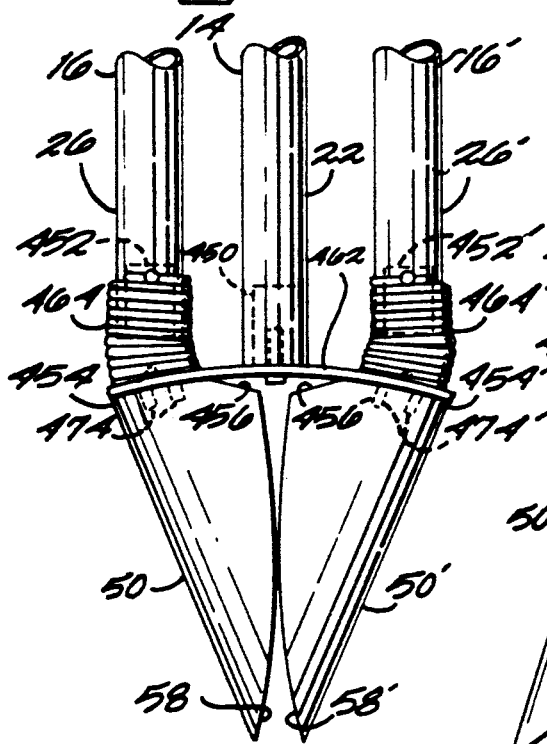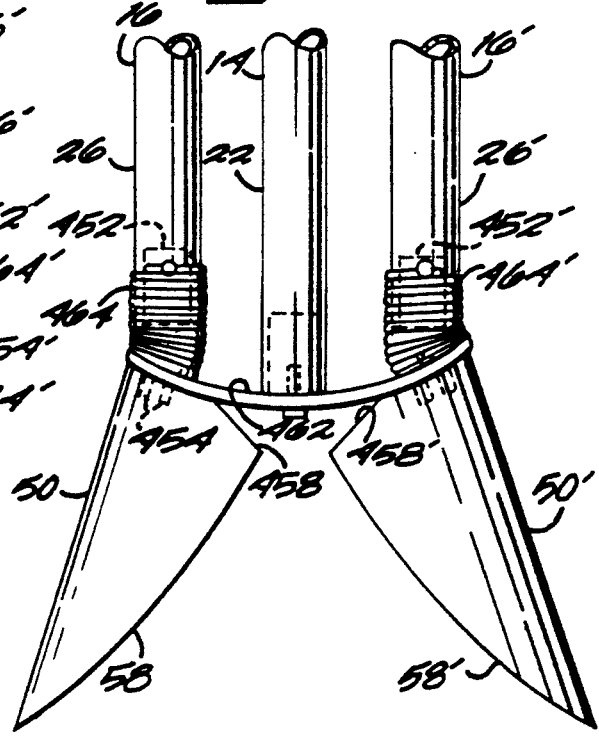

POST HOLE DIGGER

BACKGROUND OF THE INVENTION

1. Field of the Invention

This application is a continuation-in-part of application Ser. No. 08/055,183, filed Apr. 30, 1993, now U.S. Pat. No. 5,273,331. The present invention relates to a post hole digger. In particular, the present invention relates to a post hole digger for digging holes of approximately constant diameter.

2. Discussion of Background

Many types of post hole diggers are known. Auger-type diggers are provided with a screw that is advanced into the ground, such as the motorized auger shown by Ovens (U.S. Pat. No. 4,961,471). Alternatively, a boring implement can be secured to an end of a post for insertion into the ground. The post is rotated to advance the implement to the desired depth, aided by a stream of water directed into the borehole (Charland, et al., U.S. Pat. No. 4,986,373). The implement is left in the ground after the post has been positioned. These types of post hole diggers are satisfactory for use in soft earth but are difficult to use in hard or rocky soil. Augers may be stalled completely by rocks. In addition, applications in park or highway maintenance require digging a single hole or a small number of holes at one location, making use of motorized augers unnecessary and impractical. Furthermore, water may not be available.

Manual post hole diggers are perhaps the most common type being sold today. The familiar "clamshell" digger consists of four main parts: two long pole-handles and two clamshell digging cups connected to the handles. The handles are moved together to separate the cups and apart to bring the cups together. Digging is accomplished by plunging the digger into the ground with the handles together, followed by spreading the handles apart to force the cups together to grip a quantity of soil. The digger is pulled out, handles still held apart, and the load is then dumped off to the side. The process is repeated until the hole is the desired depth.

Any homeowner is familiar with this type of digger and its principal problem: as the hole is dug deeper, the handles cannot be spread apart sufficiently far to grip the soil unless the diameter of the top of the hole is made progressively larger—otherwise, the handles will bind with the top edge of the hole. This type of digger requires time and effort for the removal of additional soil, and provides a less firm foundation for a post set into the hole when the loosened soil is used as fill.

Many constant-hole-diameter post hole diggers have been developed in attempts to solve this problem. Some designs have scissors-type connections between the two poles to allow digging deeper holes before the hole needs to be enlarged (Stormsgaard, U.S. Pat. No. De. 311,853; Weiland, U.S. Pat. No. 4,042,270). Most constant-hole-diameter diggers have a pair of opposing clamshell-type digging blades pivotally mounted at the lower end of a shaft. A pull rod inside the shaft opens and closes the blades. Such diggers are provided by Rice (U.S. Pat. Nos. 2,712,467; 2,654,626), Arens (U.S. Pat. No. 2,710,765), Sonnenberg (U.S. Pat. No. 2,435,473), Loos, et al. (U.S. Pat. No. 2,230,498), Mayeda, et al. (U.S. Pat. No. 2,028,680), McDowell (U.S. Pat. No. 1,888,929) and Theriot (U.S. Pat. No. 1,706,332). These devices are complex and expensive to make, and awkward to use. None of the devices can be extended in length for digging deeper holes.

There is a need for a constant-hole-diameter post hole digger that is simple and inexpensive to make, reliable, and simple to use.

SUMMARY OF THE INVENTION

According to its major aspects and broadly stated, the present invention is a post hole digger having a first shaft assembly, a second shaft assembly, two spaced apart handles, and means for pivotally connecting the handles to the first shaft assembly and the second shaft assembly. As the handles are rotated with respect to one another, the first shaft assembly moves axially with respect to the second shaft assembly to open and close the digging blades; in particular, rotation of the handles toward each other closes the blades. The shaft assemblies are held in spaced relation to one another during operation of the digger so that the hole dug by the present digger will have an approximately constant diameter. A detent mechanism is provided for indicating when the digging blades are oriented approximately parallel to one another for insertion into the ground. In some preferred embodiments, extension rods can be added to increase the operating length of the shafts to allow digging deeper holes.

In a preferred embodiment of the present invention, the digger has a center shaft and two side shafts, each shaft with a first end and a second end. The first end of the center shaft is mounted to a bracket plate. To the second end of the center shaft is pivotally mounted a pair of digging blades, with one blade also pivotally attached to the second end of each side shaft. A pair of spaced apart, outwardly facing "L"-type brackets, each bracket carrying a handle, is pivotally attached to the bracket plate, with a side shaft pivotally attached to each bracket. As the handles are rotated towards one another, the brackets pivot with respect to the plate and the side shafts are extended with respect to the center shaft to close the digging blades. Conversely, as the handles are rotated away from one another, the side shafts are retracted with respect to the center shaft to open the blades. The shafts are maintained in approximately parallel, spaced relation to one another during operation of the digger.

In another preferred embodiment of the invention, a pair of spaced apart, inwardly-facing "L"-type brackets is pivotally attached to the bracket plate, with each bracket pivotally attached to the first end of the second shaft assembly. The first end of the first shaft assembly is connected to a bracket plate. Both digging blades are pivotally attached to the second end of the second shaft assembly, with each blade also pivotally attached to the second end of the first shaft assembly. A handle is mounted to each bracket. The handles are rotated towards one another to extend the first shaft assembly with respect to the second shaft assembly and close the digging blades. The handles are rotated away from one another to retract the first shaft assembly with respect to the second shaft assembly and open the blades.

An important feature of the present invention is the interconnection between the bracket plate, the brackets, and the first and second shaft assemblies. The second shaft assembly is pivotally attached to the brackets, which in turn are pivotally attached to the bracket plate. Rotation of the handles pivots the brackets and the second shaft assembly with respect to the bracket plate, moving the second shaft assembly axially with respect to the first shaft assembly to open and close the digging blades. The orientation of the brackets ensures that inward rotation of the handles closes the blades while outward rotation of the handles opens the blades. The axial movement of the first and second shaft assemblies assures that the digger can dig a hole of constant diameter.

The relationship of the first shaft assembly and the second shaft assembly constitutes another important feature of the present invention. The relative, axial movement of the first shaft assembly with respect to the second shaft assembly opens and closes the digging blades. Unlike the other post hole diggers described above, where a center shaft surrounds a shaft that operates the blades, the first and second assemblies are spaced apart. This arrangement simplifies construction and reduces the cost of the digger. Also, in this configuration, the shafts can be lengthened by extension rods if needed for digging deeper holes.

Another feature of the invention is the combination of the detent and the keeper. The detent is biased to the center of the keeper and provides an audible "click" when it moves into the indentation of the keeper and a tactile indication, because of the slight force needed to move it out of the biased position in either direction, that the blades are aligned for insertion into the ground. Alternatively, springs connected between the first shaft assembly and the second shaft assembly bias the assemblies into a position where the digging blades are axially aligned.

Still another feature of the invention is the movement of the handles to operate the digging blades. The operator moves the handles together to close the blades and apart to open the blades, rather than together to separate the blades and apart to bring the blades together as in the conventional clamshell digger. Lifting a digger while pushing the hands together is easier than lifting while pulling the handles apart, as in conventional diggers.

Another feature of the invention is the combination of the handles, the brackets and the bracket plate. The handles are mounted to the brackets, which are pivotally attached to the bracket plate on either side of the first shaft assembly. The second shaft assembly is pivotally attached to the brackets. The bracket plate helps to maintain the first shaft assembly and the second shaft assembly in spaced relation to one another during operation of the digger; thus, the digger has a compact profile for insertion into the ground and digging a hole with approximately constant diameter.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1a is a front view of a post hole digger according to a preferred embodiment of the present invention;

FIG. 1b is a side view of the digger of FIG. 1a;

FIG. 2a is a front view of a post hole digger according to an alternative preferred embodiment of the present invention;

FIG. 2b is a side view of the digger of FIG. 2a;

FIG. 3 is a front view of a post hole digger according to an alternative embodiment of the present invention;

FIG. 4 is a detail view of the digger of FIG. 3;

FIG. 5 is a front view of a post hole digger according to another alternative embodiment of the present invention;

FIG. 6a is a front, detail view of the post hole digger of FIG. 1a, showing a pivot means according to an alternative preferred embodiment of the present invention in a rest position;

FIG. 6b is a side view of the digger of FIG. 6a;

FIG. 6c shows the digger of FIG. 6a in a closed position;

FIG. 6d shows the digger of FIG. 6a in an open position;

FIG. 7a is a front, detail view of the post hole digger of FIG. 1a, showing a pivot means according to another preferred embodiment of the present invention; and FIG. 7b is a side view of the digger of FIG. 7a.

DETAILED DESCRIPTION OF PREFERRED EMBODIMENTS

Referring now to FIG. 1a, there is shown a post hole digger 10 according to a preferred embodiment of the present invention. Digger 10 has a bracket plate or support plate 12, a center shaft 14, a first side shaft 16 and a second side shaft 16'. Center shaft 14 has a first end 20 and a second end 22; side shafts 16, 16' have first ends 24, 24' and second ends 26, 26', respectively. First end 20 of shaft 14 is attached to bracket plate 12 by a bolt, pin, or other fastening means 28.

Two brackets 30, 30' are oriented as shown in FIG. 1a. Brackets 30, 30' have first ends 32, 32', second ends 34, 34', and center portions 36, 36', respectively. First ends 32, 32' are pivotally attached to bracket plate 12 by swivel pins 40, 40', and second ends 34, 34' holds handles 42, 42'. Center portions 36, 36' are attached to first ends 24, 24', respectively, of side shafts 16, 16' by bolts or pins 44, 44'. Handles 42, 42' have inner portions 46,46' and outer portions 48,48', respectively. While brackets 30, 30' are illustrated as being outward-facing "L"-type brackets, it will be understood that brackets 30, 30' may be of any convenient shape.

A pair of opposing digging blades 50, 50' are pivotally attached to second ends 26, 26' of side shafts 16, 16' by pins 52, 52', respectively. First ends 56, 56' of blades 50, 50' are pivotally attached to second end 22 of center shaft 14 by a pivot pin 54, generally as shown in FIGS. 1a and 1b. Blades 50, 50' may be the familiar type of clamshell cups, or any other suitable shovel-, spoon- or spade-shaped blades adapted for digging holes. If desired, blades 50, 50' may be provided with sharpened or serrated edges to facilitate insertion into the ground. As will be explained below, rotation of handles 42, 42' with respect to one another rotates brackets 30, 30' with respect to plate 12, moving side shafts 16, 16' with respect to center shaft 14 to open and close blades 50, 50'.

Rotation of handles 42, 42' about pivot pins 40, 40' causes pins 44, 44' to rotate about pins 40, 40' at a radius equal to the spacing of the pins on brackets 30, 30'. Thus, when handle 42' is rotated counterclockwise about pivot pin 40' towards handle 42, bracket 30' pivots about pin 40', which remains fixed with respect to bracket plate 12 and center shaft 14. Pin 44' moves downwards with respect to pin 40', causing shaft 16 to move downwards with respect to center shaft 14. Similarly, when handle 42 is rotated clockwise towards handle 42', bracket 30 pivots about pin 40 and pin 44 moves downwards along with shaft 16. Conversely, counterclockwise rotation of handle 42 and clockwise rotation of handle 42' cause pins 44, 44' and shafts 16, 16' to move upwards.

Since center shaft 14 is anchored to bracket plate 12, side shafts 16, 16' move axially with respect to shaft 14 as handles 42, 42' are rotated with respect to one another. That is, side shafts 16, 16' and center shaft 14 move in opposite directions. "Axial" means that side shafts 16, 16' move in a direction parallel to the major axis of digger 10 which is also parallel to the axis of the hole. When handles 42, 42' are moved together, shaft 16 is extended with respect to bracket plate 12 and center shaft 14, and blade 50 pivots on pins 52 and 54, rotating counterclockwise with its tip 58 moving towards the tip 58' of blade 50'. Similarly, shaft 16' is extended with respect to shaft 14 and bracket plate 12, and blade 50' rotates clockwise with tip 58' moving towards tip 58. Retraction of shafts 16, 16'—by moving handles 42, 42' apart—opens the blades by rotating blade 50 clockwise and blade 50' counterclockwise to separate tips 58, 58'.

To use digger 10, the operator grasps inner portions 46, 46' of handles 42, 42', and rotates the handles until digging blades 50, 50' are axially aligned with side shafts 16, 16' in a first open position A (see FIG. 1a). When in position A, inner portions 46, 46' are approximately parallel and blades, 50, 50' are open and approximately parallel to one another, ready for insertion into the ground. The operator positions digger 10 over the desired site and inserts blades 50, 50' into the ground.

To grasp a load of soil for removal, the operator holds outer portions 48, 48' of handles 42, 42', forcing handles 42, 42' to rotate on pivot pins 40, 40'. The inward rotation of handles 42, 42' causes outer shafts 16, 16' to move downwards with respect to center shaft 14, so digging blades 50, 50' pivot on pins 52, 52' and 54 to a closed position for holding a load of soil. When closed, digging blades 50, 50' form a closed scoop as indicated by position B in FIG. 1a.

The operator lifts digger 10 out of the ground while holding handles 42, 42' at upper portions 48, 48'. As long as the operator continues to lift at upper portions 48, 48', digging blades 50, 50' remain closed about the load and no additional mechanism is required to hold the load during lifting. The handles—and the operator's hands—are held close together while moving a load of dirt.

Once digger 10 has been removed from the hole, the operator positions digger 10 at a dump site and rotates handles 42, 42' outwards to a second open position to release the load, approximately position C as indicated in FIG. 1a. Handles 42, 42' pivot outwards on pins 40, 40', retracting side shafts 16, 16' with respect to center shaft 14 and rotating digging blades 50, 50' outwards on pivot pins 52, 52' and 54, opening the blades and releasing the load. The operator returns digger 10 to position A, and repeats the operation until the hole is of the desired depth. Since side shafts 16, 16' are maintained is spaced relation to center shaft 14 during operation—preferably approximately parallel to center shaft 14—the hole is of approximately constant diameter.

If desired, a detent plate 60 may be attached to side shafts 16, 16' by bolts, pins or other suitable fasteners 62, 62'. Plate 60 is spaced apart from center shaft 14, as best seen in FIG. 1b. A detent pin 64 is mounted to plate 60, and a keeper 66 is attached to center shaft 14. Keeper 66 is positioned so that, as plate 60 moves axially with respect to center shaft 14, carried by side shafts 16, 16', pin 64 engages keeper 66 just at the point where digging blades 50, 50' are axially aligned with respect to the shafts. Thus, keeper 66 may be a metal strip with an indentation 68 sized to accept pin 64, or some other type of keeper that urges pin 64 into indentation 68 with an audible "click" and a slight resistance felt in handles 42, 42' in moving them from the position they are in when pin 64 is in indentation 68. Detent plate 60, pin 64 and keeper 66 provide tactile feedback to the operator of digger 10, allowing the operator to sense when digging blades 50, 50' are properly aligned for insertion into the ground. When blades 50, 50' are axially aligned with shafts 16, 16', approximately parallel to one another as indicated by position "A" in FIG. 1a, digger 10 is in an open position and ready for insertion into the ground.

If desired, digger 10 may be lengthened for use in making deeper holes. As shown in FIGS. 2a and 2b, center shaft 14 may be formed in two sections, an upper section 70 having a first end 20 and a second end 72, and a lower section 74 with a first end 76 and a second end 22. Similarly, side shafts 16, 16' have upper sections 80, 80' with first ends 24, 24' and second ends 82, 82', and lower sections 84, 84' with first ends 86, 86' and second ends 26, 26', respectively.

An extension rod 90 is attached to upper section 70 and lower section 74 of center shaft 14. Rod 90 is clamped to second end 72 of upper section 70 by clamps 92, and to first end 76 of lower section 74 by clamps 94. Similarly, extension rods 96, 96' are attached to upper sections 80, 80' and lower sections 84, 84' of side shafts 16, 16'. Rods 96, 96' are clamped to second ends 82, 82' of upper sections 80, 80' by clamps 98, 98', and to first ends 86, 86' of lower sections 84, 84' by clamps 100, 100', respectively. Clamps 92, 94, 98, 98', 100, 100' are preferably "U" clamps such as are known in the art, or other suitable clamps for adjustably attaching extension rods 90, 96, 96' to shafts 14, 16, 16', respectively.

As best seen in FIG. 2b, extension rods 90, 96, 96' are offset bracket plate 12. Thus, a suitable length of rod 90 is positioned between upper section 70 and lower section 74 of center shaft 14. Similarly, a suitable length of rods 96, 96' is positioned between the upper sections 80, 80' and lower sections 84, 84' of shafts 16, 16', respectively. The excess length of rods 90, 96, 96' extends past bracket plate 12 above digger 10 without the operator's fingers touching the rods during use of digger 10. As the hole is dug deeper, clamps 92, 98, 98', 100, 100' may be loosened to allow repositioning of rods 90, 96, 96'.

As the hole becomes deeper and the operating length of digger 10 become longer, a point is reached where the operator can no longer comfortably lift digger 10 out of the hole and retain the load in digging blades 50, 50' by holding handles 42, 42' together. At this point, the operator may temporarily fasten the handles in their most inward position. This may be done, for example, by wrapping a belt or strap around the handles. Suitable materials for use with the present invention include hook-and-loop type fasteners such as VELCRO ™ strap. After closing handles 42, 42' and loading blades 50, 50' with dirt, the operator wraps the strap about the handles, locking the handles together. After raising the digger, the operator removes the tape, opens handles 42, 42' and dumps the load. Thus, the only limitation to the depth of hole that can be dug with digger 10 is the strength of the operator to raise and lower the digger.

Digger 10 is made of any materials that are suitable for outdoor use, preferably durable, substantially non-corroding and lightweight materials such as aluminum, stainless steel, fiberglass and composite materials. Side shafts 16, 16' and extension rods 96, 96' are preferably made of a resilient, flexible material, such as hollow piping. As digging blades 50, 50' rotate about pin 54, the spacing between pins 26 and 26' varies. Similarly, the spacing between pins 44 and 44' varies as handles 42, 42' rotate about pins 40, 40'. This variation in spacing between pins 26 and 26', and between pins 44 and 44', is accommodated by the inherent flexibility of outer shafts 16, 16'—and extension rods 96, 96' if used—rather than providing toggle links or other means for varying the spacing to accommodate the movement of the shafts. Shafts 16, 16' are therefore made of a material that is elastically deformable within the limits of operability of digger 10, such as type EMT galvanized piping, some other type of electrical thinwall tubing, or similar material. Thus, a digger according to the present invention is simple and inexpensive to make from durable, readily available materials.

As seen in FIGS. 3 and 4, a post hole digger according to the present invention may have other configurations of center and side shafts without departing from the spirit of the invention. A post hole digger 200 according to an alternative preferred embodiment of the present invention is shown in FIG. 3. Digger 200 has a bracket plate 212, a first split shaft assembly 214 and a second split shaft assembly 216. First split shaft assembly 214 has a first shaft 220 having a first end 222 and a second end 224. First end 222 is attached to bracket 212 by a bolt, pin, rivet or other fastening means 226. Second end 224 is attached to a "Y" bracket 228 by fastening means 230. A pair of second shafts 232, 232' have first ends 234, 234' and second ends 236, 236', respectively. First ends 234, 234' are attached to bracket 228 by fasteners 238, 238', respectively.

Second split shaft assembly 216 has a pair of first shafts 250, 250' with first ends 252, 252' and second ends 254, 254', respectively. First ends 252, 252' are pivotally attached to brackets 256, 256' by swivel pins 258, 258' or other suitable means. Second ends 254, 254' are attached to a "Y" bracket 260 by fasteners 262, 262', respectively. A second shaft 264, having a first end 266 and a second end 268, is attached to bracket 260 by fasteners 240.

Brackets 228 and 260 are generally "Y"-shaped brackets as shown in FIG. 3, capable of maintaining the relative alignment of shafts 220, 232, 232' of first split shaft assembly 214 and shafts 250, 250', 264 of second split shaft assembly 216. Fasteners 230, 238, 238', 240, 262, 262', may be pins, bolts, rivets, or some other suitable type of fastener. If convenient, shafts 220, 232, 232' may be integrally formed with bracket 228, and shafts 250, 250', 264 may be integrally formed with bracket 260.

Brackets 256, 256' are pivotally attached to bracket 212 by swivel pins 270, 270'. A pair of handles 274, 274', having outer portions 276, 276' and inner portions 278, 278' are rigidly attached to brackets 256, 256' by fasteners 272, 272'. Brackets 256, 256' are inwardly-facing "L"-type brackets, oriented opposite to corresponding brackets 30, 30' of digger 10 (see FIG. 1). However, as will be described below, this orientation of brackets 256, 256' produces the desired motion of first shaft assembly 216 with respect to second shaft assembly 214 when handles 274, 274' are rotated.

A pair of opposing digging blades 280, 280' have first ends 282, 282' and second ends 284, 284', respectively. First ends 282, 282' are pivotally attached by pins 292, 292' to second ends 236, 236' of second shafts 232, 232', respectively, of first split shaft assembly 214. First ends 282, 282' are pivotally attached by a single pin 294 to second end 268 of second shaft 264 of second split shaft assembly 216. If desired, digger 200 may include extension rods such as those described above for digger 10.

A detent mechanism such as that described above for digger 10 may be provided for digger 200. However, other types of detent mechanism may be used if desired. For example, a spring 296 may be attached to bracket 260 at fasteners 262, 262' and bracket 228 at fasteners 230, generally as shown in FIG. 3. If desired, a similar spring 298 may be attached to the brackets at fasteners 238, 238' and 240.

Alternatively, holes 242, 244, 244' may be formed through fasteners 230, 262, 262', respectively (FIG. 4). A wire 218 is inserted through holes 242, 244, 244'. Ends 286, 286' of wire 218 are shaped to prevent removal of the wire, or fastened to bracket 260 by suitable means (not shown). Wire 218 may be, for example, 0.15" (about 0.38 cm) diameter piano wire, or some other material that can act as a flat or leaf spring to bias shaft assemblies 214 and 216 into a neutral position (blades "open" or aligned). A similar wire may be used with fasteners 238, 238', 240 if desired.

Springs 296, 298 (or wire 218) bias shaft assemblies 214 and 216 into a neutral, open position, with digging blades 280, 280' approximately parallel to one another. As digging blades 280, 280' are closed, first shaft assembly 214 moves downwards with respect to second shaft assembly 216. Springs 296, 298 (or wire 218) are deflected upwards at fasteners 230 and 240, respectively, generating an opposing or restoring force. As blades 280, 280' are opened by the operator, springs 296, 298 (or wire 218) are deflected downwards, generating the opposite restoring force. Springs 296, 298 and wire 218 are suitably biased to produce a restoring force for any position of digging blades 280, 280' other than approximately parallel to one another. The restoring force can be adjusted by adjusting the length and stiffness of springs 296, 298 or wire 218. It will be evident that a detent mechanism such as spring 296 or wire 218 may be connected to center shaft 14 and side shafts 16, 16' of digger 10.

Rotation of handles 274, 274' about pivot pins 258, 258' causes pins 270, 270' to rotate about pins 258, 258' at a radius equal to the spacing of the pins on brackets 256, 256'. Handles 274, 274' are rotated inwards to extend first shaft assembly 214 with respect to second shaft assembly 216 and close digging blades 280, 280', bringing second ends 284, 284' together. Conversely, handles 274, 274' are rotated outwards to retract assembly 214 with respect to assembly 216, opening blades 280, 280'.

When handles 274, 274' are rotated inwards, pins 258, 258' move upwards with respect to bracket plate 212, causing shafts 250, 250' (and second shaft assembly 216) to move upwards. As second shaft assembly moves upwards, first shaft assembly 214 is extended with respect to second shaft assembly 216. Shafts 232, 232' of first shaft assembly 214 move downwards with respect to shaft 264 of second shaft assembly 216, and digging blades 280, 280' pivot inwards. Outward rotation of handles 274, 274' causes retraction of first shaft assembly 214 with respect to second shaft assembly 216, so that digging blades 280, 280' pivot outwards.

A post hole digger 300 according to another preferred embodiment of the present invention is shown in FIG. 5. Digger 300 has a bracket plate 312, a first split shaft assembly 314 and a second split shaft assembly 316. First shaft assembly 314 has a first shaft 320 with a first end 322 and a second end 324, and a second shaft 326 with a first end 328 and a second end 330. Second shaft assembly 316 has a first shaft 332 with a first end 334 and a second end 336, and a second shaft 338 with a first end 340 and a second end 342.

First ends 322, 328 of shafts 320, 326, respectively, are pivotally attached to bracket 312 by a pin 344. A pair of digging blades 346, 346' have first ends 348, 348' and second ends 350, 350', respectively. Second ends 324, 330 of shafts 320, 326 are pivotally attached to first ends 348, 348' of digging blades 346, 346' by pins 354, 354', respectively. First ends 334, 340 of shafts 332, 338 are pivotally attached to brackets 360, 360' by pins 362, 362'. Second ends 336, 342 are pivotally attached to first ends 348, 348' of digging blades 346, 346' by a single pivot pin 364. Brackets 360, 360' are pivotally attached to bracket 312 by pins 366, 366'. A pair of handles 370, 370' are rigidly attached to brackets 360, 360' by fasteners 372, 372'.

Brackets 360, 360', like brackets 256, 256' of digger 200, are inwardly-facing "L"-type brackets. As will now be evident, inward rotation of handles 370, 370' causes brackets 360, 360' to pivot with respect to bracket plate 312. Shafts 332, 338 of assembly 316 move upwards with respect to bracket plate 312, so that digging blades 346, 346' pivot inwards on pins 364, 354, 354', and second ends 350, 350' move together. Outward rotation of handles 370, 370' causes assembly 316 to move downwards with respect to plate 312, so blades 346, 346' pivot outwards and second ends 350, 350' separate.

Digger 300 may be provided with the type of detent mechanisms described above for diggers 10 and 200. Alternatively, one or more detents can be formed in shaft assemblies 314, 316, indicated generally by reference characters 374, 374' of FIG. 5. Thus, a depression or "keeper" might be formed in either or both of shafts 332, 338, and a corresponding ridge formed in shafts 320, 326. These would be suitably shaped and positioned so that shafts 332 and 320, and shafts 338 and 326, "click" together just at the point where digging blades 346, 346' are approximately axially aligned with one another. Either type of detent mechanism—or some other suitable type of detent—provides tactile and audible feedback to the operator of the digger, allowing the operator to sense when digging blades 50, 50' of digger 10, blades 280, 280' of digger 200, and blades 346, 346' of digger 300 are properly aligned for insertion into the ground.

Diggers 200 and 300, like digger 10, are preferably made of durable, lightweight, substantially noncorroding materials such as aluminum, stainless steel, fiberglass and composite materials. Shafts 220, 232, 232', 250, 250', 264, 320, 326, 332 and 338 may be formed of some resilient, flexible material, such as hollow piping, preferably type EMT galvanized piping or similar material.

The operating lifetime of a digger according to the present invention may be extended by protecting the pivot pins from deterioration caused by direct contact with wet soil, rain, and other environmental conditions that may adversely affect their operation. For example, pins that may contact the soil during operation of the digger may be protected by standard bearing-sealing techniques such as "O"-rings (pins 52, 52', 54 of digger 10; pins 52, 52', 54 of digger 10; pins 292, 292', 294 of digger 200; pins 354, 354', 364 of digger 300).

Alternatively, the digging blades may be pivotally attached to the shafts by other means, as shown in the following examples. Thus, ends 22, 26, 26' of hollow shafts 14, 16, 16' may be provided with plugs 450, 452, 452', respectively, as shown in FIGS. 6a and 6b. Plugs 450, 452, 452' are preferably spot-welded to the shaft walls, but may be secured by other methods such as press-fitting, riveting, and so forth if desired. Digging blades 50, 50' are formed with upper ends 454, 454' and sloping portions 456, 456', respectively.

A pivot means 460 includes a spring member 462 and springs 464, 464'. Member 462 is attached to plug 450 by a bolt 466 or other suitable fastener. Springs 464, 464' are wound about ends 26, 26' of shafts 16, 16', and attached to the shafts by bolts 472, 472', respectively. Springs 464, 464' are attached to upper ends 454, 454' of digging blades 50, 50' by bolts 474, 474', respectively. Plugs 452, 452' support spring-retaining bolts 472, 472' and distribute the load from the bolts to the shaft walls. However, plugs 450 and 452, 452' may be omitted, and spring member 462 and springs 464, 464' attached directly to shafts 14 and 16, 16' if desired. Springs 464, 464' extend beyond ends 26, 26' of shafts 16, 16', as shown in FIGS. 6a and 6b.

Spring member 462 of pivot means 460 is a flat strip of some material that readily bends up or down as shaft 14 is extended or retracted with respect to shafts 16, 16', but resists bending in other directions. Spring member 462 joins ends 454, 454' of digging blades 50, 50' together and to shafts 14, 16, 16' so that the blades can rotate between their open and said closed positions. Member 462 may be, for example, a thin strip of tempered carbon steel, a strip of suitably-reinforced hard rubber, or a section of automobile timing chain surrounded by an elastic casing. Springs 464, 464' are preferably the type of coiled spring whose coils touch one another when the spring is in the rest position. Such a spring remains approximately straight when in the rest position, i.e. it does not wobble back and forth, nor is it stretched by the weight of a load of soil carried by digging blades 50, 50'. In addition, there is a strong restoring force to urge the spring back to the rest position when it is stretched or bent. Preferably, the spring is sufficiently strongly biased to the rest position so as to constitute a detent. Therefore, a detent mechanism such as those described above may not be needed. However, a detent plate 60 may be provided to ensure that the movement of outer shaft 16 tracks the movement of shaft 16'. Springs 464, 464' are attached to shafts 16, 16' so that the springs are in their rest positions when digging blades 50, 50' are axially aligned with one another (FIG. 6b).

In operation, the combination of spring member 462 and springs 464, 464' pivots digging blades 50, 50' as side shafts 16, 16' move axially with respect to shaft 14. When shafts 16, 16' are extended with respect to shaft 14, springs 464, 464' stretch and bend inwards, spring member 462 bends downwards and tips 58, 58' of digging blades 50, 50' move towards one another (FIG. 6c). When shafts 16, 16' are retracted with respect to shaft 14, springs 464, 464' bend outwards, member 462 bends upwards and tips 58, 58' move apart (FIG. 6d).

A sufficient length of springs 464, 464' extends beyond ends 26, 26' of shafts 16, 16' to accommodate the flexing of spring member 462 and the movement of digging blades 50, 50', respectively. As will be evident from FIGS. 6c and 6d, upper ends 454, 454' of digging blades 50, 50' are fixed to member 462 while sloping portions 456, 456' rotate with respect to member 462 during operation of digger 10. Thus, sloping portions 456, 456' are angled with respect to upper ends 454, 454' so as to allow free inward and outward rotation of tips 58, 58'. The optimum length and hardness of spring member 462 and springs 464, 464' are determined in view of the dimensions and materials selected for digger 10.

Still another pivot means usable with the present invention is shown in FIGS. 7a and 7b. A pivot means 500 includes spring members 502 and 504, 504'. Member 502 is attached to plug 450 by a bolt 510 or other suitable fastener, and to ends 454, 454' of digging blades 50, 50' by bolts 512, 512', respectively. Spring members 504, 504' have hollow portions 514, 514', fastened to ends 26, 26' of shafts 16, 16' by any suitable means, including welding, press-fitting, and so forth. Portions 514, 514' may, however, be bolted or riveted to shafts 16, 16' if desired. Generally "L"-shaped portions 516, 516' depend from portions 514, 514', and are attached to spring member 502 by bolts, rivets or other suitable fasteners 518, 518'. Fasteners 518, 518' and fasteners 512, 512' may be the type of fastener that is threaded at both ends, with one end attached to digging blades 50, 50' (serving as fasteners 512, 512') and the other end attached to member 502 (serving as fasteners 518, 518').

Spring member 502, like spring member 462 of pivot means 460, is a generally flat strip of some flexible, spring-like material that is readily bent up or down as shaft 14 is extended or retracted with respect to shafts 16, 16'. Similarly, portions 516, 516' of spring members 504, 504' are a type of flat spring that flexes in the direction of rotation of digging blades 50, 50', but resists bending in other directions. Portions 516, 516' are attached to shafts 16, 16' in such a manner that, when portions 516, 156' are in their rest positions, digging blades 50, 50' are axially aligned with one another. Portions 516, 516' exert a restoring force to urge blades 50, 50' to their aligned position in the absence of operator action, but flex to accommodate the inward or outward rotation of the blades when handles 42, 42' are rotated by the operator. As with springs 452, 452' of pivot means 460 described above, portions 516, 516' are preferably sufficiently biased to their rest positions so as to constitute a detent-type mechanism. Spring member 502 joins ends 454, 454' of digging blades 50, 50', and also joins ends 454, 454' to shafts 14, 16, 16' so that the blades can rotate between their open and said closed positions.

Pivot means such as those described above may be provided for diggers 200 and 300 as well as for digger 10. As will now be evident, other types of pivoting mechanism may be provided for digging blades 50, 50' (and blades 280, 280'; blades 346, 346') without departing from the spirit of the present invention. Use of pivot means 460 or 500 substantially eliminates the movement of metal parts against one another during operation of the digger, such as occurs when pin bearings (pivot pins 52, 52', 54, etc.) are used to operate the digging blades. Therefore, pivot means 460 and 500 increase the operating life of digger by reducing the possibility that such bearings will be abraded by contact with soil.

In all embodiments of the present invention, rotation of the handles moves the first shaft assembly with respect to the second shaft assembly to open and close the digging blades. However, brackets 30, 30' of digger 10 face outwardly with respect to center shaft 14. Brackets 256, 256' of digger 200, and brackets 360, 360' of digger 300, face inwardly with respect to first shaft assemblies 214 and 314, respectively. In digger 10, the outward orientation of brackets 30, 30' means that inward rotation of handles 42, 42' causes extension of side shafts 16 and 16' with respect to center shaft 14 to close digging blades 50, 50'. In digger 200, the inward orientation of brackets 256, 256' means that inward rotation of handles 274, 274' causes retraction of second shaft assembly 216 with respect to center shaft assembly 214 to close blades 280, 280'. Similarly, the inward orientation of brackets 360, 360' of digger 300 results in retraction of second shaft assembly 316 with respect to first shaft assembly 314 to close blades 346, 346'. The choice of bracket orientation in all embodiments ensures that inward rotation of the handles closes the digging blades, and outward rotation of the handles opens the blades.

It will be apparent to those skilled in the art that many changes and substitutions can be made to the preferred embodiment herein described without departing from the spirit and scope of the present invention as defined by the appended claims.

What is claimed is:

1. A post hole digger, comprising:
    two spaced apart handles;
    a first shaft assembly;
    a second shaft assembly spaced apart from said first shaft assembly;
    bracket means for pivotally connecting said two spaced apart handles to said first shaft assembly and said second shaft assembly so that, when said two spaced-apart handles are moved, said first shaft assembly moves axially in a first direction and said second shaft assembly moves axially in a second direction opposite said first direction;
    two digging blades, said digging blades having a first end and a second end, said two digging blades movable between an open position wherein said second ends are apart and a closed position wherein said second ends are together; and
    pivot means joining said first ends of said two digging blades together and to said second shaft assembly and about which said two digging blades can pivot between said open and said closed positions,
    said first shaft assembly attached to said first ends of said two digging blades so that, as said first shaft assembly moves in said first direction and said second shaft assembly moves in said second direction, said blades move from said open position to said closed position in response to said movement of said first and second assemblies, said blades moving to said open position as said handles are moved away from one another and to said closed position as said handles are moved towards one another.

2. The post hole digger as recited in claim 1, wherein said bracket means further comprises:
    a plate attached to said second shaft assembly; and
    means pivotally attached to said plate and pivotally attached to said first shaft assembly for translating pivoting movement of said handles to axial movement of said first shaft assembly in said first direction and axial movement of said plate in said second direction.

3. The post hole digger as recited in claim 1, wherein said bracket means further comprises:
    a plate attached to said first shaft assembly; and
    means pivotally attached to said plate and pivotally attached to said second shaft assembly for translating pivoting movement of said handles to axial movement of said plate in said first direction and axial movement of said second shaft assembly in said second direction.

4. The post hole digger as recited in claim 1, wherein said bracket means further comprises:
   a plate attached to said second shaft assembly; and
   a pair of brackets pivotally attached to said plate and pivotally connecting said handles to said first shaft assembly, said brackets pivoting with respect to said plate in response to pivoting movement of said handles, moving said first shaft assembly in said first direction and said plate and said second shaft assembly in said second direction.

5. The post hole digger as recited in claim 1, wherein said bracket means further comprises:
   a plate attached to said first shaft assembly; and
   a pair of brackets pivotally attached to said plate and pivotally connecting said handles to said second shaft assembly, said brackets pivoting with respect to said plate in response to movement of said handles, moving said plate and first shaft assembly in said first direction and said second shaft assembly in said second direction.

6. The post hole digger as recited in claim 1, further comprising means for indicating when said two digging blades are in said open position.

7. The post hole digger as recited in claim 1, wherein said first shaft assembly further comprises two side shafts and said second shaft assembly further comprises a center shaft assembly.

8. The post hole digger as recited in claim 1, wherein said first shaft assembly has a split shaft connecting said bracket means to said pivot means, and wherein said second shaft assembly has a split shaft connecting said bracket means to said two digging blades.

9. A post hole digger, comprising:
   two digging blades, each of said digging blades having a first end and a second end;
   pivot means connecting said first ends of said two digging blades together so that said two digging blades can rotate between an open position wherein said second ends are spaced apart and a closed position wherein said second ends are together;
   a central shaft assembly pivotally connected to said pivot means;
   a side shaft assembly spaced apart from said central shaft assembly and connected to said first ends of said two digging blades so that when said side shaft assembly moves in a first axial direction and said central shaft assembly moves in a second axial direction opposite that of said first axial direction, said two digging blades move between said open and said closed positions;
   means in operational connection with said central and said side shaft assemblies for moving said central and said side shaft assemblies so that said central shaft assembly moves in said first axial direction when said side shaft assembly moves in said second axial direction; and
   two handles rotatably attached to said moving means for lifting said post hole digger and for controlling said moving means, said moving means responsive to movement of said two handles so that said blades move to said closed position as said handles are moved towards one another and to said open position as said handles are moved away from one another.

10. The post hole digger as recited in claim 9, wherein said moving means further comprises:
    a plate; and
    two brackets pivotally attached to said plate, said handles attached to said brackets so that, as said handles are moved, said brackets pivot with respect to said plate.

11. The post hole digger as recited in claim 9, wherein said moving means further comprises:
    a plate; and
    two brackets pivotally attached to said plate, said handles attached to said brackets so that, as said handles are moved together, said brackets pivot with respect to said plate and said central shaft assembly and said side shaft assembly causing said two digging blades to move to said closed position.

12. The post hole digger as recited in claim 9, wherein said moving means further comprises:
    a plate; and
    two brackets pivotally attached to said plate, said handles attached to said brackets so that, as said handles are moved, said brackets pivot with respect to said plate,
    said central shaft assembly attached to said plate and said side shaft assembly pivotally attached to said brackets so that, as said brackets pivot with respect to said plate, said central shaft assembly moves in said first axial direction when said side shaft assembly moves in said second axial direction.

13. The post hole digger as recited in claim 9, wherein said moving means further comprises:
    a plate; and
    two brackets pivotally attached to said plate, said handles attached to said brackets so that, as said handles are moved, said brackets pivot with respect to said plate,
    and wherein said central shaft assembly further comprises a split shaft having a left central shaft attached to one bracket of said two brackets and a right central shaft attached to a second bracket of said two brackets,
    said side shaft assembly being attached to said plate so that, as said brackets pivot with respect to said plate, said side shaft assembly moves in said first axial direction and said left and said right central shafts move in said second axial direction.

14. The post hole digger as recited in claim 9, wherein said moving means further comprises:
    a plate; and
    two brackets pivotally attached to said plate, said handles attached to said brackets so that, as said handles are moved, said brackets pivot with respect to said plate,
    said central shaft assembly pivotally attached to said brackets and said side shaft assembly attached to said plate so that, as said brackets pivot with respect to said plate, said central shaft assembly moves in said first axial direction when said side shaft assembly moves in said second axial direction.

15. The post hole digger as recited in claim 9, wherein said side shaft assembly further comprises a split shaft having a left side shaft attached to said first end of one digging blade of said two digging blades and a right side shaft attached to said first end of a second digging blade, and said moving means further comprises:
    a plate; and
    two brackets pivotally attached to said plate, said handles attached to said brackets so that, as said handles are moved, said brackets pivot with respect to said plate, said central shaft assembly pivotally attached to said two brackets and said split shaft attached to said plate so that, as said two brackets pivot with respect to said plate, said central shaft assembly moves in said first axial direction when said left and said right side shafts move in said second axial direction.

16. The post hole digger as recited in claim 9, further comprising means for indicating when said two digging blades are in said open position.

17. The post hole digger as recited in claim 9, further comprising:
a detent plate carried by said side shaft assembly;
a detent attached to said detent plate; and
a keeper carried by said central shaft assembly and having an indentation for receiving said detent when said central shaft assembly and said side shaft assembly are axially aligned so that said two digging blades are in said open position.

18. The post hole digger as recited in claim 9, further comprising a spring running from said side shaft assembly to said central shaft assembly, said spring deflecting when said two digging blades are moved from said axially aligned position to indicate when said two digging blades are in said axially aligned position.

19. The post hole digger as recited in claim 9, further comprising means for extending said central shaft assembly and said side shaft assembly.

20. The post hole digger as recited in claim 9, wherein said pivot means further comprises a spring member carried by said central shaft assembly, said spring member connecting said first ends of said digging blades together, and wherein said post hole digger further comprises:
first spring means for connecting a first digging blade of said two digging blades to said side shaft assembly; and
second spring means for connecting a second digging blade of said two digging blades to said side shaft assembly, said spring member, said first spring means and said second spring means flexing to accommodate the axial movement of said central shaft assembly and said side shaft assembly as said digging blades move between said open and said closed positions.

* * * * *